(12) United States Patent
Byrne et al.

(10) Patent No.: US 11,990,124 B2
(45) Date of Patent: May 21, 2024

(54) LANGUAGE MODEL PREDICTION OF API CALL INVOCATIONS AND VERBAL RESPONSES

(71) Applicant: Google LLC, Mountain View, CA (US)

(72) Inventors: William J. Byrne, Mountain View, CA (US); Karthik Krishnamoorthi, San Jose, CA (US); Saravanan Ganesh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 335 days.

(21) Appl. No.: 17/645,739

(22) Filed: Dec. 22, 2021

(65) Prior Publication Data

US 2023/0197070 A1 Jun. 22, 2023

(51) Int. Cl.
*G10L 15/26* (2006.01)
*G10L 13/02* (2013.01)
*G10L 15/06* (2013.01)
*G10L 15/18* (2013.01)
*G10L 15/197* (2013.01)
*G10L 15/22* (2006.01)
*G10L 15/30* (2013.01)

(52) U.S. Cl.
CPC ............ *G10L 15/197* (2013.01); *G10L 13/02* (2013.01); *G10L 15/063* (2013.01); *G10L 15/22* (2013.01)

(58) Field of Classification Search
CPC ......... G10L 15/26; G10L 15/22; G10L 15/30; G10L 15/18
See application file for complete search history.

(56) References Cited

U.S. PATENT DOCUMENTS

| 10,853,150 | B1* | 12/2020 | Bahrami | G06N 5/022 |
| 2018/0039478 | A1 | 2/2018 | Sung et al. | |
| 2021/0026735 | A1* | 1/2021 | Hall | G10L 15/22 |
| 2021/0174806 | A1* | 6/2021 | Krishnaswamy | G10L 15/1822 |

(Continued)

OTHER PUBLICATIONS

International Search Report and Written Opinion for the related Application No. PCT/US2022/081362, dated Mar. 27, 2023, 82 pages.

(Continued)

*Primary Examiner* — Shreyans A Patel
(74) *Attorney, Agent, or Firm* — Honigman LLP; Brett A. Krueger; Grant Griffith (57) ABSTRACT

A method includes obtaining an utterance from a user including a user query directed toward a digital assistant. The method includes generating, using a language model, a first prediction string based on the utterance and determining whether the first prediction string includes an application programming interface (API) call to invoke a program via an API. When the first prediction string includes the API call to invoke the program, the method includes calling, using the API call, the program via the API to retrieve a program result; receiving, via the API, the program result; updating a conversational context with the program result that includes the utterance; and generating, using the language model, a second prediction string based on the updated conversational context. When the first prediction string does not include the API call, the method includes providing an utterance response to the utterance based on the first prediction string.

28 Claims, 6 Drawing Sheets

(56) References Cited

U.S. PATENT DOCUMENTS

2022/0343079 A1* 10/2022 Bhattacharya ......... G06N 20/00
2023/0395067 A1* 12/2023 Perkins .................. G10L 15/18

OTHER PUBLICATIONS

Namdev Aditi et al: "Automated Appointment Booking System via Voice Recognition", IJCRT2105867 International Journal of Creative Research Thoughts (IJCRT), May 5, 2021 (May 5, 2021), p. 155, XP093032628 , Retrieved from the Internet: ORL:https ://www. ijcrt.org/papers/IJCRT2105 <http://www.ijcrt.org/papers/IJCRT2105> 867.pdf, [retrieved on Mar. 17, 2023] the whole document, 5 pages.

* cited by examiner

LANGUAGE MODEL PREDICTION OF API CALL INVOCATIONS AND VERBAL RESPONSES

TECHNICAL FIELD

This disclosure relates to language model prediction of API call invocations and verbal responses.

BACKGROUND

Task-based dialog systems (e.g., ticketing, shopping, reservations, food ordering, etc.) aim to solve the complex problem of responding naturally and relevantly to any user input based on current conversational context while directing the conversation toward task fulfillment (e.g., a purchase, confirmed reservation, etc.). Often, furthering the conversation requires a response to the user (e.g., "What movie would you like tickets for?"). However, in some scenarios, the conversational context requires for the task-based dialog system to execute an information lookup from, for example, an external data source. The system may summarize the results in a response to the user.

SUMMARY

One aspect of the disclosure provides a computer-implemented method for language model prediction that when executed by data processing hardware causes the data processing hardware to perform operations. The operations include obtaining an utterance from a user that includes a user query directed toward a digital assistant. The operations also include generating, using a language model, a first prediction string based on the utterance. The operations also include determining whether the first prediction string includes an application programming interface (API) call to invoke a program via an API. When the first prediction string includes the API call to invoke the program, the operations include calling, using the API call, the program via the API to retrieve a program result responsive to the utterance; receiving, via the API, the program result; updating a conversational context with the program result, the conversational context including the utterance; and generating, using the language model, a second prediction string based on the updated conversational context. When the first prediction string does not include the API call, the operations include providing, for output from a user device, an utterance response to the user based on the first prediction string.

Implementations of the disclosure may include one or more of the following optional features. In some implementations, the operations further include, when the first prediction string includes the API call to invoke the program, determining whether the second prediction string includes the API call to invoke the program via the API, and when the second prediction string does not include the API call, providing, for output from the user device, a second utterance response to the user based on the second prediction string. In these implementations, the operations may further include, after providing the second utterance response to the user, obtaining an additional utterance from the user directed toward the digital assistant, further updating the updated conversational context with the additional utterance from the user, and generating, using the language model, a third prediction string based on the further updated conversational context.

In some examples, obtaining the utterance includes obtaining a transcription of a verbal utterance spoken by the user and captured by the user device in streaming audio. Optionally, obtaining the transcription may include receiving the transcription of the verbal utterance from the digital assistant. Here, the digital assistant generates the transcription by performing speech recognition on audio data characterizing the verbal utterance. In these examples, obtaining the transcription may include receiving audio data characterizing the verbal utterance and performing speech recognition on the audio data characterizing the verbal utterance to generate the transcription.

In some implementations, obtaining the utterance includes receiving a textual representation of the utterance that was input by the user via the user device. The utterance response may include an audible representation including synthesized speech audibly output from the digital assistant. Optionally, the utterance response may include a textual representation displayed on a graphical user interface (GUI) executing on the digital assistant.

In some examples, the language model includes a pre-trained language model that is fine-tuned using labeled training samples. In these examples, the labeled training samples may include annotated API call invocations. Optionally, the operations further include, when the first prediction string includes the API call to invoke the program via the API, determining, from the first prediction string, one or more parameters for the API call and at least one value for each of the one or more parameters. In some implementations, wherein the language model includes a single end-to-end machine learning model. The language model may include a text-to-text transfer transformer language model.

Another aspect of the disclosure provides a system for language model prediction. The system includes data processing hardware and memory hardware in communication with the data processing hardware. The memory hardware stores instructions that when executed on the data processing hardware cause the data processing hardware to perform operations. The operations include obtaining an utterance from a user that includes a user query directed toward a digital assistant. The operations also include generating, using a language model, a first prediction string based on the utterance. The operations include determining whether the first prediction string includes an application programming interface (API) call to invoke a program via an API. When the first prediction string includes the API call to invoke the program, the operations include calling, using the API call, the program via the API to retrieve a program result responsive to the utterance; receiving, via the API, the program result; updating a conversational context with the program result, the conversational context including the utterance; and generating, using the language model, a second prediction string based on the updated conversational context. When the first prediction string does not include the API call, the operations include providing, for output from a user device, an utterance response to the user based on the first prediction string.

This aspect may include one or more of the following optional features. In some implementations, the operations further include, when the first prediction string includes the API call to invoke the program, determining whether the second prediction string includes the API call to invoke the program via the API and, when the second prediction string does not include the API call, providing, for output from the user device, a second utterance response to the user based on the second prediction string. In these implementations, the operations may further include, after providing the second utterance response to the user, obtaining an additional utterance from the user directed toward the digital assistant, further updating the updated conversational context with the additional utterance from the user, and generating, using the language model, a third prediction string based on the further updated conversational context.

In some examples, obtaining the utterance includes obtaining a transcription of a verbal utterance spoken by the user and captured by the user device in streaming audio. Optionally, obtaining the transcription may include receiving the transcription of the verbal utterance from the digital assistant. Here, the digital assistant generates the transcription by performing speech recognition on audio data characterizing the verbal utterance. In these examples, obtaining the transcription may include receiving audio data characterizing the verbal utterance and performing speech recognition on the audio data characterizing the verbal utterance to generate the transcription.

In some implementations, obtaining the utterance includes receiving a textual representation of the utterance that was input by the user via the user device. The utterance response may include an audible representation including synthesized speech audibly output from the digital assistant. Optionally, the utterance response comprises a textual representation displayed on a graphical user interface (GUI) executing on the digital assistant.

In some examples, the language model includes a pre-trained language model that is fine-tuned using labeled training samples. In these examples, the labeled training samples may include annotated API call invocations. Optionally, the operations further include, when the first prediction string includes the API call to invoke the program via the API, determining, from the first prediction string, one or more parameters for the API call and at least one value for each of the one or more parameters. In some implementations, wherein the language model includes a single end-to-end machine learning model. The language model may include a text-to-text transfer transformer language model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Speech-based interfaces such as digital assistants are becoming increasingly prevalent across a variety of devices including, without limitation, mobile phones and smart speakers/displays that include microphones for capturing speech. These assistants may be used to leverage tasked-based dialog systems that facilitate fulfilling a task (e.g., buying movie tickets) for a user in a conversational manner. Conventionally, these systems implement large numbers of hand-written rules. The hand-written rules are used to determine whether the system should provide a response to a user or should first retrieve data from an external source (e.g., via an application programming interface (API)). For example, a system may include a hand-written rule that instructs the system to access the user's location when the user asks for nearby restaurant suggestions. These hand-written rules are not only time-consuming to manually implement, but they severely restrict the scalability and reusability of the system.

Modern machine learning models use training to recognize patterns in data. General purpose language models are frequently used in applications such as automatic speech recognition (ASR). These models are capable of recognizing and translating broad portions of human speech. The models are typically trained on large datasets to allow for broad usage. However, tasks common for task-based dialog systems (e.g., ticketing, shopping, reservations, etc.) involve specific vocabulary and a canonical order of events not commonly found in the datasets used to train general purpose language models.

Implementations herein are directed toward a language model prediction system that provides language model prediction of, for example, API call invocations and verbal responses. The system includes a language prediction model that is fine-tuned from a pre-trained large language model using a custom, labeled dataset. The language prediction model, based on a conversational context, predicts whether the system should execute an information lookup (e.g., via calling an external program through an API) or whether the system should provide a response (e.g., verbal, textual, etc.) to the user that may or may not be based on a result from an information lookup through an API call. The language prediction system is capable of predicting both program invocations and user responses with high accuracy, thereby simplifying the architecture of the system and eliminating the need for hand-written rules.

Figure 1:
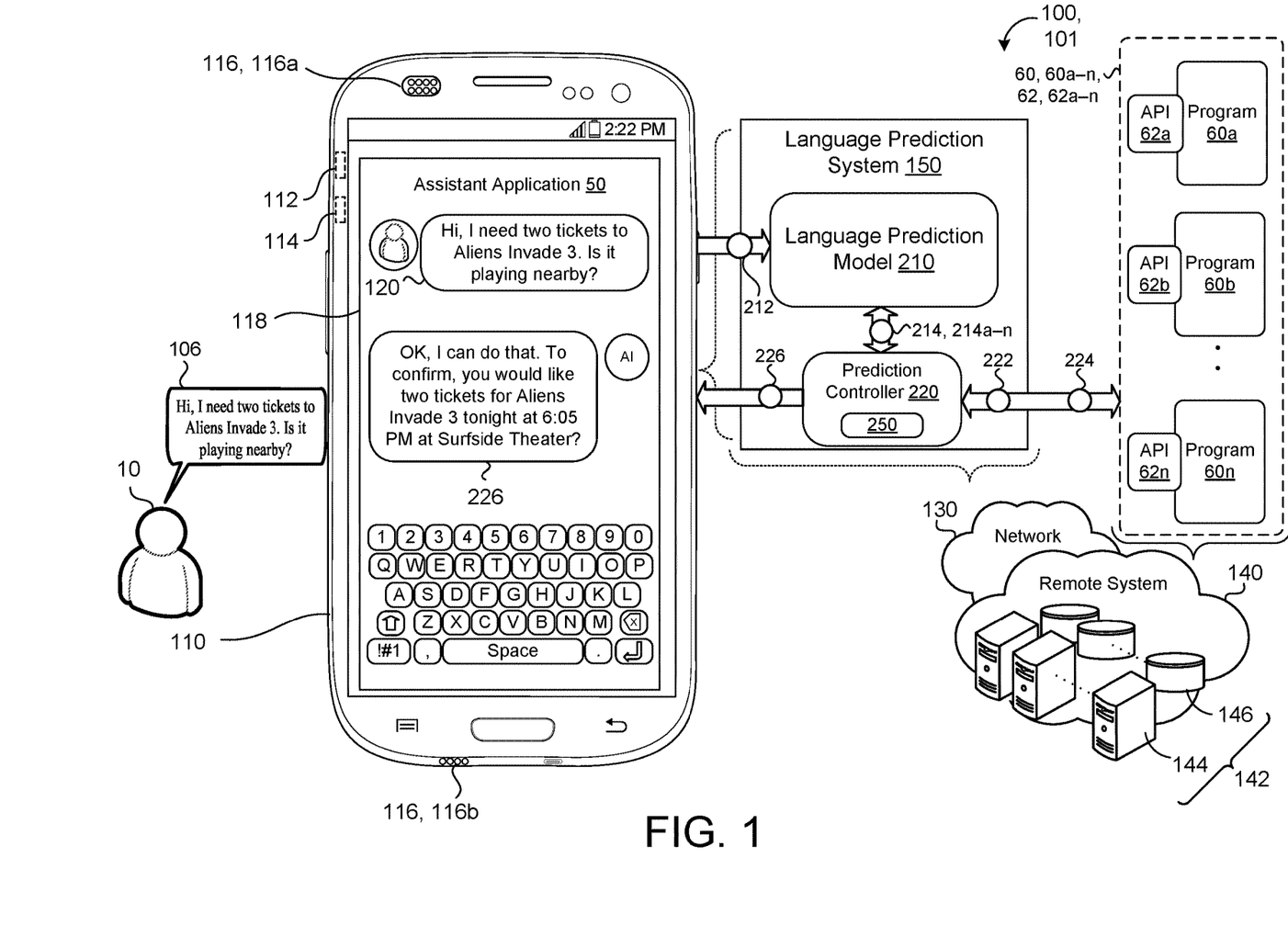
FIG. 1 is a schematic view of an example system for language model prediction using both application programming interface (API) call invocations and verbal responses.

FIG. 1 is an example of a system 100 operating in a speech environment 101. In the speech environment 101, a user's 10 manner of interacting with a computing device, such as a user device 110 (e.g., a digital assistant), may be through voice input. The user device 110 is configured to capture sounds (e.g., streaming audio data) from one or more users 10 within the speech environment 101. Here, the streaming audio data may refer to a spoken utterance 106 by the user 10 that functions as an audible query, a command for the user device 110, or an audible communication captured by the user device 110. Speech-enabled systems of the user device 110 may field the query or the command by answering the query and/or causing the command to be performed/fulfilled by one or more downstream applications.

The user device 110 may correspond to any computing device associated with a user 10 and capable of receiving audio data or other user input. Some examples of user devices 110 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 110 includes data processing hardware 112 and memory hardware 114 in communication with the data processing hardware 112 and stores instructions, that when executed by the data processing hardware 112, cause the data processing hardware 112 to perform one or more operations. The user device 110 further includes an audio system 116 with an audio capture device (e.g., microphone) 116, 116a for capturing and converting spoken utterances 106 within the speech environment 101 into electrical signals and a speech output device (e.g., a speaker) 116, 116b for communicating an audible audio signal (e.g., as output audio data from the user device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio system 116.

In the speech environment 101, a language prediction system 150 implementing a language prediction model 210 resides on the user device 110 of the user 10 and/or on a remote computing device 140 (e.g., one or more remote servers of a distributed system executing in a cloud-computing environment) in communication with the user device 110 via a network 130. In some implementations, the user device 110 communicates via a network 130 with the remote system 140. The remote system 140 may include remote resources 142, such as remote data processing hardware 144 (e.g., remote servers or CPUs) and/or remote memory hardware 146 (e.g., remote databases or other storage hardware). The user device 110 may utilize the remote resources 142 to perform various functionality related to language prediction. For instance, some or all of the language prediction system 150 may reside on the remote system 140. In one example, the language prediction system 150 resides on the user device 110 while in another example, the language prediction system 150 resides on the remote system to provide server-side language prediction. In yet another example, functionality of the language prediction system 150 is split across the user device 110 and the server 140.

The language prediction system 150 converts the utterance 106 into a corresponding digital representation 212 (e.g., a textual representation such as a string) via, for example, an ASR system (not shown) and provide the digital representation 212 to the language prediction model 210. In some examples, the digital representation 212 is a transcription of the verbal utterance 106 provided by the user 10 and directed toward a digital assistant application 50 executing on the user device 50 and/or the remote system 140. That is, an ASR system may generate the transcription by performing speech recognition on audio data characterizing the verbal utterance 106 spoken by the user 10 and captured by the user device 110. For example, the ASR system receives, from the user device 110, audio data characterizing the verbal utterance 106 and performs speech recognition on the audio data characterizing the verbal utterance to generate the transcription (i.e., digital representation 212).

The language prediction model 210 may include an end-to-end machine learning model (e.g., a text-to-text transfer transformer (T5) language model) that predicts or generates prediction strings 214, 214a-n. In the example shown, the user 10 speaks a respective utterance 106 and the language prediction system 150 converts the utterance 106 into the digital representation 212 for input to the language prediction model 210. Thereafter, the language prediction model 210, using the digital representation 212, generates/predicts, as output, a first prediction string 214a based on the utterance 106.

In some examples, such as FIG. 1, the user 10 interacts with a program or application 50 (e.g., the digital assistant application 50) executing on the user device 110 that uses and/or is in communication with the language prediction system 150. For example, the assistant application 50 obtains or receives the digital representation 212 of the utterance 106 that the user directed toward the digital assistant application 50 and provides the digital representation 212 to the language prediction system 150 (e.g., executing at the user device 110 and/or the remote system 140). The digital assistant application 50 may display a transcription 120 corresponding to the user utterance 106. Similarly, the digital assistant application 50 may execute on the remote system 140 and the user device 110 may interact with the digital assistant application 50 via a web-based interface.

In some implementations, the language prediction system 150 includes a prediction controller 220. The prediction controller 220 receives each prediction string 214 generated by the language prediction model 210. In some examples, the prediction controller 220, for each respective prediction string 214 generated by the language prediction model 210, determines whether the respective prediction string 214 includes an API call 222 (or any other means for requesting/retrieving data external to the language prediction system 150 and/or language prediction model 210, such as function calls, process calls, and the like) to invoke a program 60, 60a-n via an API 62, 62a-n. Each API 62 defines a software-to-software interface that allows the prediction controller 220, via the API call 222, to request information responsive to the utterance 106 from the corresponding program 60. The prediction string 214, in some examples, includes one or more parameters and at least one value for each parameter for the API call 222. The values are provided for the parameters of the API call 222 when the corresponding API 62 is called. Thus, for each API call 222, the prediction controller 220 may also determine the necessary parameters and values to use the API call 222. For example, an API call 222 for a restaurant reservation system may include a parameter for number of guests and a value that satisfies the parameters (e.g., four).

When the respective prediction string 214 includes an API call 222, the prediction controller 220 calls, using the API call 222, the corresponding program 60 via the corresponding API 62. For example, the prediction controller 220 determines whether a predetermined order of characters or symbols exists within the prediction string 214 that designates an API call 222. In some examples, the prediction controller 220 performs one or more translations or changes to the API call 222 to properly format the API call 222 with respect to the corresponding API 62. That is, the prediction string 214 may include a generic, abstract, or otherwise non-conforming format for the API call 222 and the prediction controller 220 translates the abstract API call 222 to conform to the specific requirements of the API 62 of the program 60 being invoked. For instance, the prediction string 214 may convey an API call 222 to query for show times at a local movie theater in a natural language of the user 10. The prediction string 214 may include an abstract (natural language) API call 222 for querying for show times while the prediction controller 220 translates, updates, or changes the API call 222 to tailor the API call 222 to the specific API 62 being called based on, for example, the user's location (e.g., which movie theater to query based on the user's location). This allows the language prediction model 210 to be scalable and reusable across a wide variety of applications, users 10, and user devices 110. For example, the same language prediction model 210 may be used for different task related schemes by only changing or updating the prediction controller 220 (e.g., by substituting and/or customizing API behavior based on real-world constraints and requirements).

After the prediction controller 220 calls, using the API call 222, the corresponding program 60 via the corresponding API 62 (i.e., when the prediction string 214 includes the API call 222), the prediction controller 220 receives a program result 224. The program result 224 represents data received from the program 60 in response to the program 60 responding to the API call 222. Using the received program result 224, the prediction controller 220 updates a conversational context 250. As described in more detail below, the conversational context 250 provides the context of all of the interactions (user utterances 106 and assistant responses 226) between the user 10 and the digital assistant application 50 during a dialog session, along with all API calls 222 and/or program results 224 sent and received by the prediction controller 220, since the initial utterance 106 from the user 10. In some examples, the conversational context 250 includes a string that the prediction controller updates by appending program results 224 and/or digital representations 212 of utterances 106 received from the user 10.

After updating the conversational context 250 with the program result 224, the prediction controller 220 provides the updated conversational context 250 to the language prediction model 210. The language prediction model 210, using the updated conversational context 250 as an input, generates a new prediction string 214. The new prediction string, 214, in some examples, includes another API call 222. In these examples, the prediction controller 220 again calls the respective API 62 using the API call 222 in the new prediction string 214. In other examples, and described in greater detail below, the new prediction string 214 does not include an API call 222.

When a prediction string 214 does not include an API call 222 (i.e., the language prediction model 210 generates an output that does not include a reference to an API call 222), the prediction controller 220 provides, for output from the user device 110, an utterance response 226 based on the prediction string 214. That is, the digital assistant application 50 delivers the utterance response 226 as output from the user device 110 to the user 10. For example, the digital assistant application 50 may cause the user device 110 to visually display a textual representation of the utterance response 226 on a graphical user interface (GUI) 118 displayed on a screen of the user device 110 and/or the digital assistant application 50 audibly provides the utterance response 226 (e.g., via one or more speakers of the user device 110) to the user 10. Thus, the prediction controller 220 determines whether an output from the language prediction model 210 (i.e., the prediction string 214) includes an API call 222 (or similar data request) or whether the output does not include an API call 222. When the prediction string 214 does include an API call 222, the prediction controller 220 takes steps to call an appropriate API 62 via the API call 222 to invoke the respective program 60 to retrieve data. When the prediction string 214 does not include the API call 222, the prediction controller 220 generates the utterance response 226 for the digital assistant application 50 to provide to the user 10. The utterance response 226, as described in more detail below, furthers fulfillment of a task specified by the user 10 (e.g., via the utterance 106).

In the example shown, the user 10 interacts with the digital assistant application 50. For instance, FIG. 1 depicts the user 10 communicating with the digital assistant application 50 and the GUI 118 displayed on the screen of the user device 110 to depict a conversation between the user 10 and the digital assistant application 50. In this example, the user 10 asks the digital assistant application 50, "Hi, I need two tickets to Aliens Invade 3. Is it playing nearby?" This question from the user 10 is a spoken utterance 106 captured by the audio capture device 116a and processed by audio systems 116 of the user device 110.

Continuing with this example, the language prediction model 210, via the language prediction system 150, receives the digital representation 212 of the user utterance 106. The language prediction model 210 generates one or more prediction strings 214 based on the digital representation 212 and the conversational context 250 provided by the prediction controller 220. Here, the language prediction model 210 generates a prediction string 214 that does not include an API call 222, and accordingly the prediction controller 220 transmits the utterance response 226 to the digital assistant application 50. In this example, the digital assistant application 50 displays, in the interface 118, a textual representation of the utterance response 226. Here, the response includes "OK, I can do that. To confirm, you would like two tickets for Aliens Invade 3 tonight at 6:05 at Surfside Theater?" Additionally or alternatively, the digital assistant application 50 provides an audible representation of the utterance response 226 for the user 10 to hear.

Figure 2:
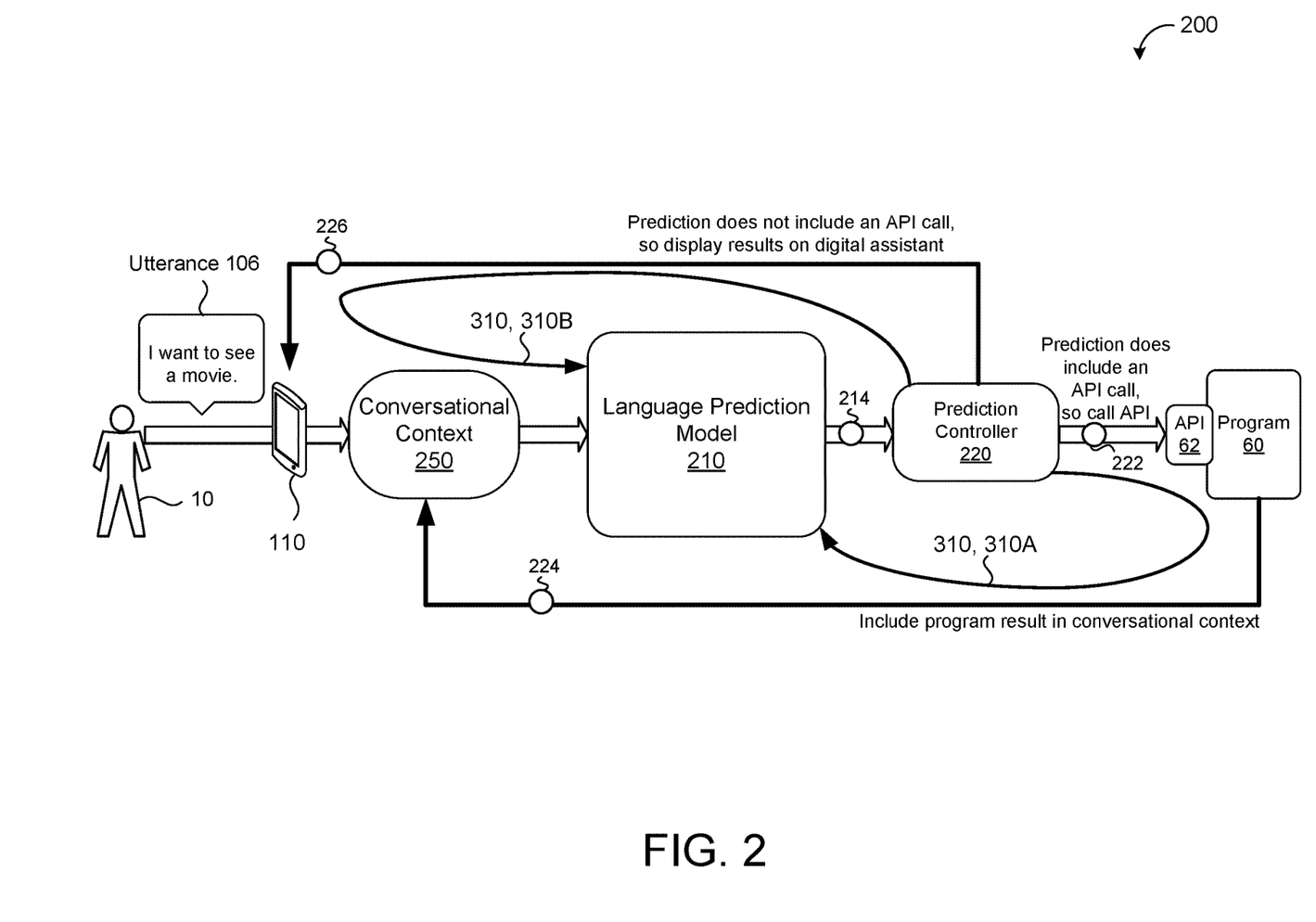
FIG. 2 is a schematic view of exemplary components of the system of FIG. 1.

Referring now to FIG. 2, in some implementations, the language prediction model 210, for each of one or more conversational turns 310, generates a prediction string 214. Each conversational turn 310 defines the language prediction model 210 receiving the conversational context 250 and generating a corresponding prediction string 214 based on the received conversational context 250. The prediction controller 220 receives the prediction string 214 and, when the prediction string 214 includes an API call 222 responsive to the utterance 106, retrieves a program result 224 and updates the conversational context 250 with the program result 224. The prediction controller 220 provides the updated conversational context 250 back to the language prediction model 210 to start the next conversational turn 310 and generate the next prediction string 214. When the prediction string 214 does not include an API call 222, the prediction controller 220 instead provides the utterance response 226 to the user 10. The user 10 may, in reply to the utterance response 226, provide another utterance 106, which the language prediction system 150 (e.g., via the prediction controller 220 or any other module), uses to update the conversational context 250 to begin the next conversational turn 310 (e.g., by providing the updated conversational context 250 to the language prediction model 210).

As shown in schematic view 200 of FIG. 2, the conversational turns 310 provide "loops" that continuously update the conversational context 250 provided to the language prediction model 210 for generating prediction strings 214. A first loop or first type of conversational turn 310, 310A occurs when the prediction controller 220 updates the conversational context 250 with the program result 224 from the program 60. A second loop or second type of conversational turn 310, 310B occurs when the prediction controller 220 and/or language prediction system 150 updates the conversational context 250 with an utterance 106 from the user 10. Notably, the first utterance 106 received from the user 10 (i.e., the initial query by the user 10 directed at the digital assistant application 50) may start or establish a first instance of the conversational context 250. As the language prediction system 150 moves toward fulfillment of any tasks specified by the user 10 in the utterances 106, the language prediction model 210, for each conversational turn 310, receives the conversational context 250 that includes all of the context (e.g., the utterances 106 and/or the program results 224) available since the initial query by the user 10.

Figure 3:
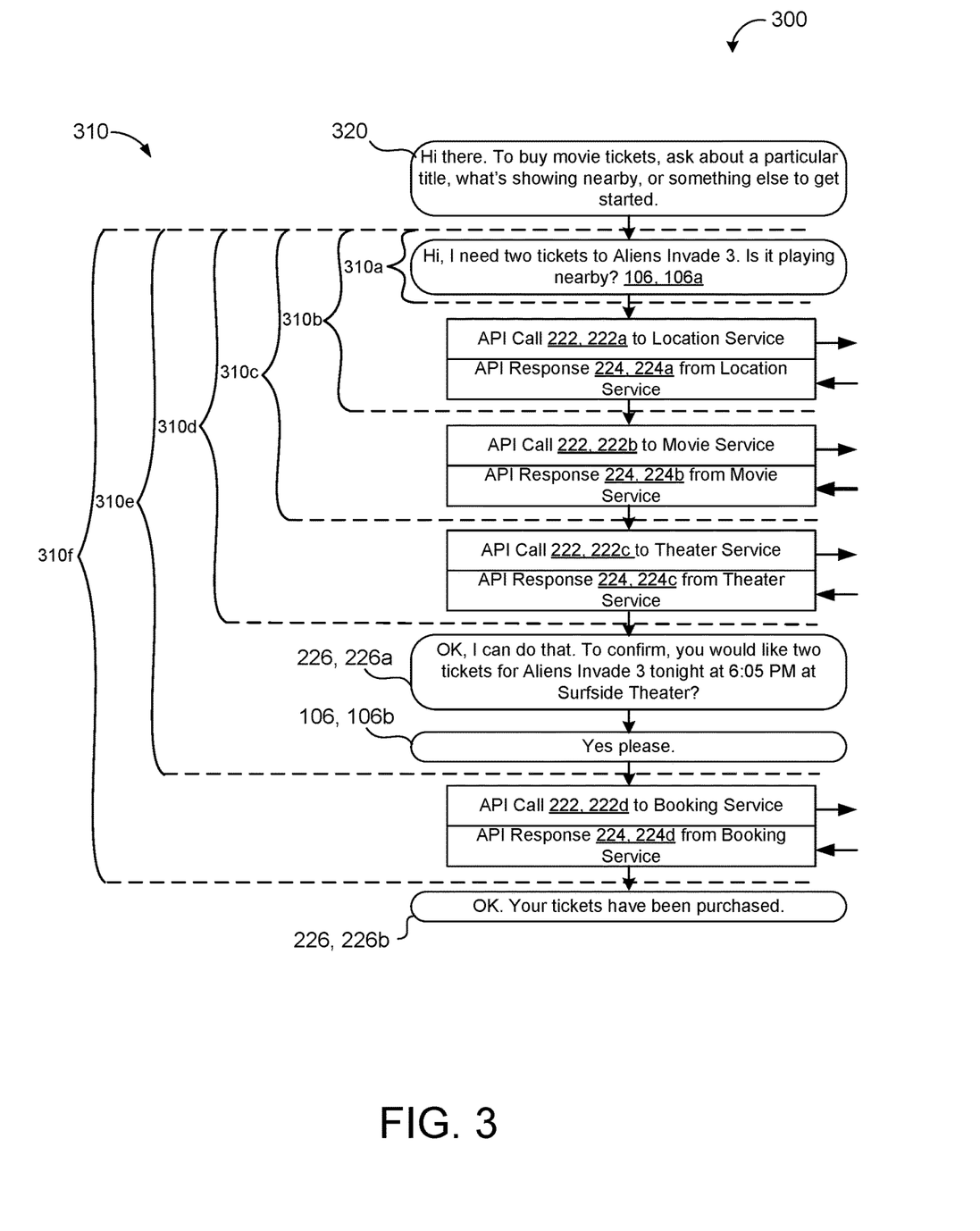
FIG. 3 is an exemplary flowchart of conversational turns in a conversational context.

Referring now to FIG. 3, a flow diagram 300 of conversational turns 310, 310*af* illustrates exemplary responses from the language prediction system 150 as the language prediction system 150 proceeds toward task fulfillment (i.e., buying movie tickets) while engaged with the user 10. In some implementations, the digital assistant application 50 begins interactions with the user 10 via an introductory message 320 that is predetermined and not defined by the language prediction model 210. Here, the introductory message 320 provides the user 10 with the message "Hi there. To buy movie tickets, ask about a particular title, what's showing nearby, or something else to get started." In this example, in response to the introductory message 320, the user 10 provides an utterance 106, 106*a* that includes "Hi, I need two tickets to Aliens Invade 3. Is it playing nearby?" As this utterance 106*a* is the first substantive input for the language prediction model 210, the first utterance 106*a* establishes a conversational context 250 and a first conversational turn 310, 310*a*.

In response to the first utterance 106*a*, the language prediction model 210 generates a first prediction string 214 (not shown) that includes a first API call 222, 222*a*. Here, the first API call 222*a* is to a location service to retrieve data on the user's current location. The prediction controller 220 accordingly calls a respective API 62, using the first API call 222*a*, to invoke a respective program 60. The program 60 responds with a first program result 224, 224*a* (i.e., an API response). In this example, the first program result 224 includes data pertaining to the current location of the user 10. As described above with regards to FIGS. 1 and 2, the prediction controller 220 updates a conversational context 250 with the first program result 224*a* and provides the updated conversational context 250 to the language prediction model 210 to establish a second conversational turn 310, 310*b*.

In response to the input from the second conversational turn 310, 310*b* (i.e., the conversational context 250 including the first utterance 106*a* and the first program result 224*a*), the language prediction model 210 generates a second prediction string 214 (not shown). Here, the prediction controller 220 determines that the second prediction string 214 includes a second API call 222, 222*b*. The second API call 222*b* is for a movie service (e.g., to retrieve data regarding a nearest location "Aliens Invade 3" is playing relative to the current location of the user 10). Accordingly, the prediction controller 220 calls an API 62 using the second API call 222*b*. The second API call 222*b* may call the same API 62 as the first API call 222*a* or a different API 62 altogether. The prediction controller 220 receives a second program result 224, 224*b*. In this example, the second program result 224*b* includes data conveying that the nearest theater playing the movie "Aliens Invade 3" is the Surfside Theater. The second program result 224*b* establishes a third conversational turn 310, 310*c*. The prediction controller 220 updates the conversational context 250 with the second program result 224*b* and provides the updated conversational context 250 back to the language prediction model 210.

Continuing with the example of FIG. 3, in response to the updated conversational context 250, the language prediction model 210 generates a third prediction string 214 (not shown) that the prediction controller 220 determines to include a third API call 222, 222*c* to a theater service. The theater service is capable of providing show times at a specific movie theater for a specific movie. The prediction controller 220 calls the theater service using the third API call 222*c* and receives a third program result 224, 224*c* that includes show times for the movie "Aliens Invade 3" at the Surfside Theater. The third program result 224*c* concludes a fourth conversational turn 310, 310*d*.

The prediction controller 220 again updates the conversational context 250 and provides the updated conversational context 250 to the language prediction model 210. This time, the language prediction model 210 generates a fourth prediction string 214 (not shown) that does not include an API call 222. Accordingly, the prediction controller 220 generates a first utterance response 226, 226*a* based on the fourth prediction string 214. In this case, the first utterance response 226*a* includes "OK, I can do that. To confirm, you would like two tickets for Aliens Invade 3 tonight at 6:05 PM at Surfside Theater?" The first response utterance 226*a* is based on fourth prediction string 214 generated by the language prediction model 210, which generated the fourth prediction string 214 based on the conversational context 250 that included the first utterance 106*a*, and the three program results 224*a-c*.

The user 10, in reply to the first utterance response 226*a*, provides a second utterance 106, 106*b* directed toward the digital assistant application 50. In this example, the second utterance 106*b* includes "Yes please." The prediction controller 220 updates the conversational context 250 with the second utterance 106*b* to establish a fifth conversational turn 310, 310*e*. The updated conversational context 250, in this example, causes the language prediction model 210 to generate a fifth prediction string 214 (not shown) that includes a fourth API call 222, 222*d* to a booking service. The booking service returns a fourth program result 224, 224*d*. The prediction controller 220 updates the conversational context 250 to complete a sixth conversational turn 310, 31*f*. The prediction controller 220 provides the updated conversational context 250 to the language prediction model 210 which results in a second response utterance 225, 226*b* that includes "OK. Your tickets have been purchased."

Figure 4:
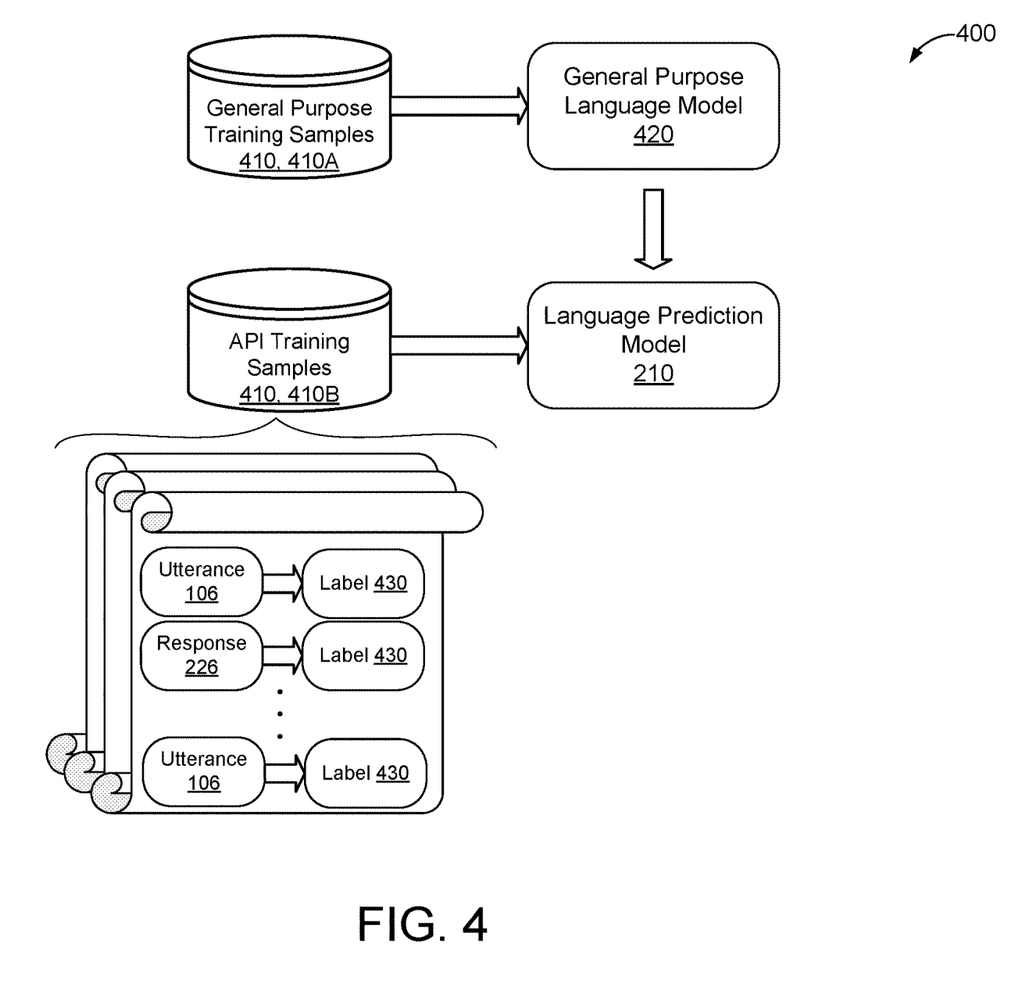
FIG. 4 is a schematic view of a training process for a language prediction model of FIG. 1.

Referring now to FIG. 4, a training process 400 for the language prediction model 210, in some implementations, includes first training, using general purpose training samples 410, 410A, a general purpose language model 420. The general purpose training samples 410A may include a very large number of samples to train for natural language processing (NLP). In some examples, the general purpose language model 420 is a text-to-text transfer transformer (T5) or similar model (i.e., a model that uses a unified framework to convert text-based language problems into a text-to-text format). By using a text-to-text framework, the general purpose language model 420, along with its loss function and hyper parameters, may be compatible with many (if not all) NLP tasks, such as machine translation, document summarization, question answering, classification tasks, etc. The general purpose language model 420 may be trained on multiple languages.

In some examples, to generate the language prediction model 210, the general purpose language model 420 is "fine-tuned" by further training the general purpose language model on a smaller set (i.e., smaller than the set of general purpose training samples 410A) of API training samples 410, 410B. In this context, fine-tuning refers to re-training the model using a custom dataset and adjusting weights accordingly. The API training samples 410B include annotations of API calls invoking programs to retrieve data external to the language prediction system 150 or language prediction model 210. For example, one or more of the API training samples 410B include annotated utterances 106 and/or utterance responses 226 and corresponding well-formed labels 430 that indicate to the language prediction model 210 the appropriate API call 222 to generate for the respective API training sample 410B.

Thus, the language prediction system 150 and the language prediction model 210 provide an "end-to-end" solution that adds each conversational turn 310 to conversational context 250 to generate prediction strings 214 that predict whether the language prediction system 150 should next perform an API call 222 or provide an utterance response 226 back to the user 10. The language prediction model 210 may generate a plurality of prediction strings 214 each conversational turn 310. Each generated prediction string 214, in some implementations, is associated with a respective weight, score, probability, etc. The prediction controller 220 may select the best prediction string 214 based on the corresponding weights, scores, or probabilities. In some examples, the prediction controller 220 selects, for two or more conversational turns 310 in a row, different API calls 222 in order to determine a logical and efficient path to fulfilling a task for the user 10. That is, two or more sequential conversational turns 310 may each include an API call 222 before an utterance response 226 is generated.

Examples herein apply to a task-based dialog system that provides textual and/or verbal responses to a user to facilitate fulfillment of a task such as ordering movie tickets. However, it is understood that these are non-limiting examples, and the language prediction system 150 is applicable to a broad range of tasks (e.g., multi-modal user interfaces). For example, the language prediction model is trained to accurately display results in a visual format or trained to interact with a web-page (e.g., clicking buttons and/or links based on verbal input from the user 10). That is, the language prediction system 150 may leverage the language prediction model 210 for any task that requires predicting either an API call invocation or a response to the user.

Figure 5:
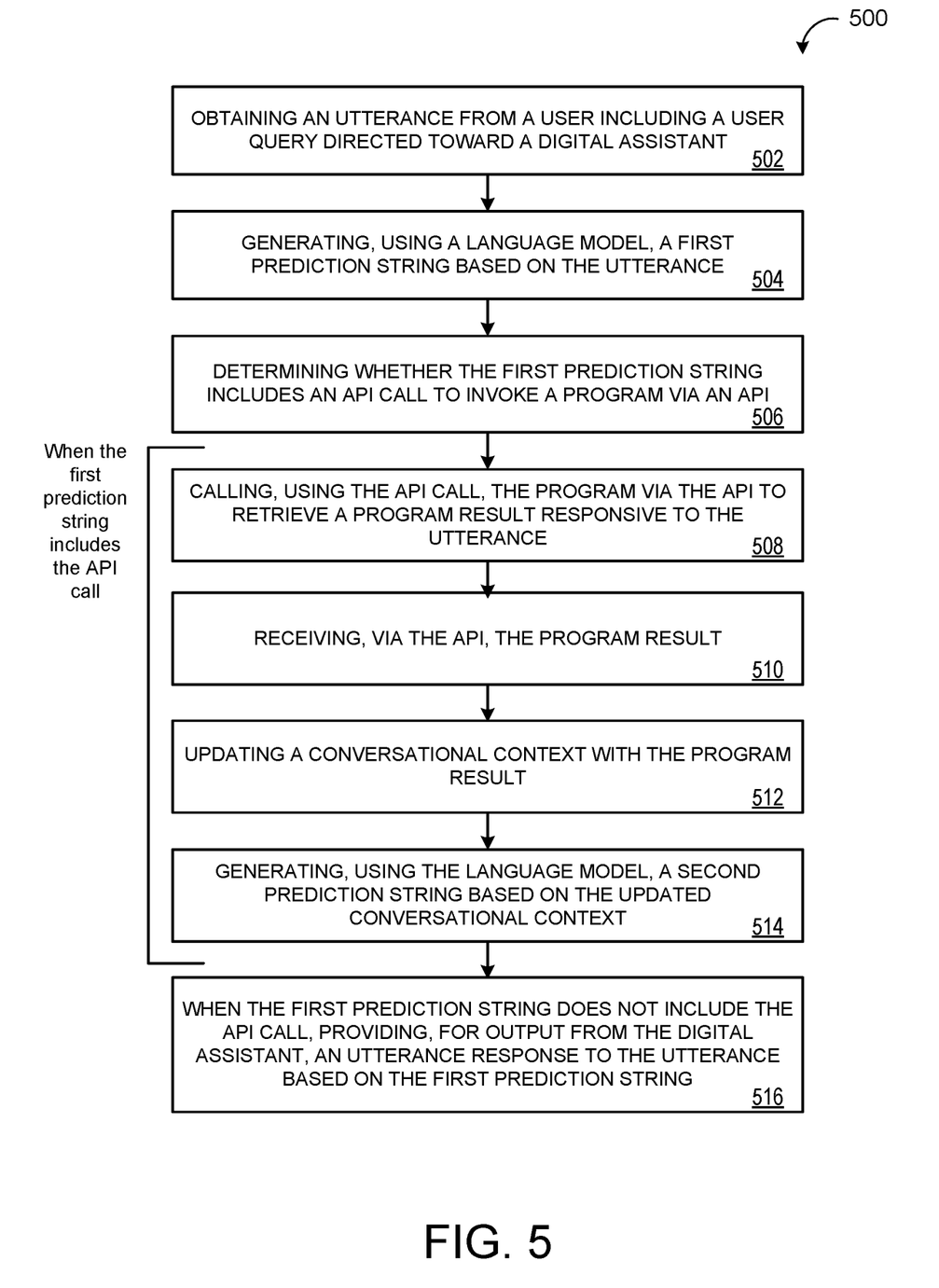
FIG. 5 is a flow chart of an example arrangement of operations for a method of language model prediction using API call invocations and verbal responses.

FIG. 5 is a flowchart of an exemplary arrangement of operations for a method 500 of language model prediction of API call invocations and utterance responses. The computer-implemented method 500, when executed by data processing hardware 112, 144 causes the data processing hardware 112, 144 to perform operations. The method 500, at operation 502, includes obtaining an utterance 106 from a user 10 including a user query directed toward a digital assistant 50. The method 500, at operation 504, includes generating, using a language prediction model 210, a first prediction string 214 based on the utterance 106. At operation 506, the method 500 includes determining whether the first prediction string 214 includes an API call 222 to invoke a program 60 via an API 62. At operation 508, the method 500 includes, when the first prediction string 214 includes the API call 222 to invoke the program 60, calling, using the API call 222, the program 60 via the API 62 to retrieve a program result 224 responsive to the utterance 106. At operation 510, the method 500 includes receiving, via the API 62, the program result 224. The method 500, at operation 512, includes updating a conversational context 250 with the program result 224. The conversational context 250 includes the utterance 106. The method 500, at operation 514, includes generating, using the language prediction model 210, a second prediction string 214 based on the updated conversational context 250. At operation 516, the method 500 includes, when the first prediction string 214 does not include the API call 222, providing, for output from the digital assistant 50, an utterance response 226 to the utterance 106 based on the first prediction string 214.

Figure 6:
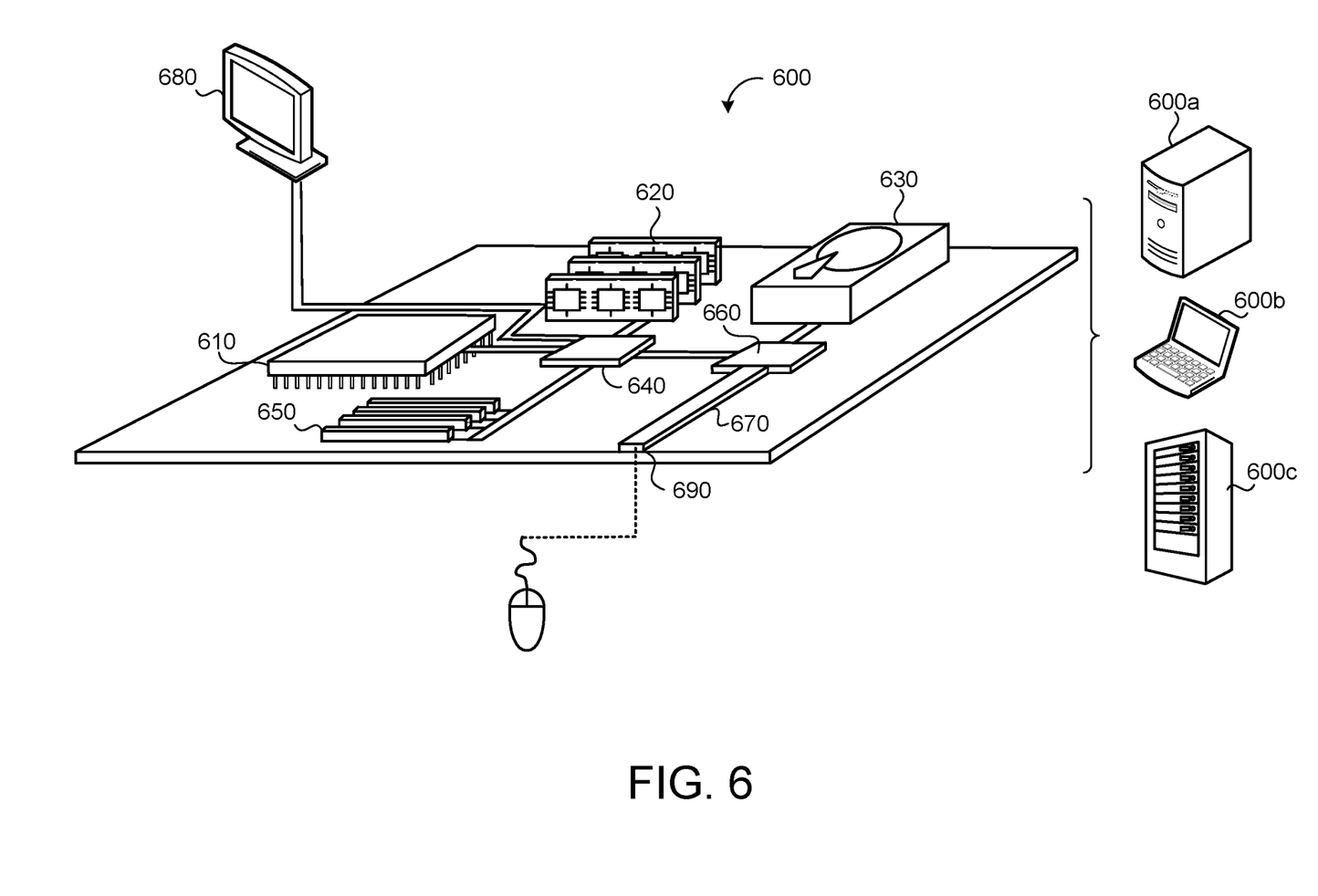
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining an utterance from a user comprising a user query directed toward a digital assistant;
   generating, using a language model, a first prediction string based on the utterance;
   determining whether the first prediction string comprises an application programming interface (API) call to invoke a program via an API;
   when the first prediction string comprises the API call to invoke the program:
      calling, using the API call, the program via the API to retrieve a program result responsive to the utterance;
      receiving, via the API, the program result;
      updating a conversational context with the program result, the conversational context comprising the utterance; and generating, using the language model, a second prediction string based on the updated conversational context; and when the first prediction string does not comprise the API call, providing, for output from the digital assistant, an utterance response to the user based on the first prediction string.

2. The method of claim 1, wherein the operations further comprise, when the first prediction string comprises the API call to invoke the program:

determining whether the second prediction string comprises the API call to invoke the program via the API; and when the second prediction string does not comprise the API call, providing, for output from the digital assistant, a second utterance response to the user based on the second prediction string.

3. The method of claim 2, wherein the operations further comprise, after providing the second utterance response to the user:

obtaining an additional utterance from the user directed toward the digital assistant;

further updating the updated conversational context with the additional utterance from the user; and generating, using the language model, a third prediction string based on the further updated conversational context.

4. The method of claim 1, wherein obtaining the utterance comprises obtaining a transcription of a verbal utterance spoken by the user and captured by the digital assistant in streaming audio.

5. The method of claim 4, wherein obtaining the transcription comprises receiving the transcription of the verbal utterance from the digital assistant, the digital assistant generating the transcription by performing speech recognition on audio data characterizing the verbal utterance.

6. The method of claim 4, wherein obtaining the transcription comprises:

receiving audio data characterizing the verbal utterance; and performing speech recognition on the audio data characterizing the verbal utterance to generate the transcription.

7. The method of claim 1, wherein obtaining the utterance comprises receiving, from the digital assistant, a textual representation of the utterance, the textual representation of the utterance input by the user via the user device.

8. The method of claim 1, wherein the utterance response comprises an audible representation including synthesized speech audibly output from the digital assistant.

9. The method of claim 1, wherein the utterance response comprises a textual representation displayed on a graphical user interface (GUI) executing on the digital assistant.

10. The method of claim 1, wherein the language model comprises a pre-trained language model that is fine-tuned using labeled training samples.

11. The method of claim 10, wherein the labeled training samples comprise annotated API call invocations.

12. The method of claim 1, wherein the operations further comprise, when the first prediction string comprises the API call to invoke the program via the API, determining, from the first prediction string:

one or more parameters for the API call; and at least one value for each of the one or more parameters.

13. The method of claim 1, wherein the language model comprises a single end-to-end machine learning model.

14. The method of claim 1, wherein the language model comprises a text-to-text transfer transformer language model.

15. A system comprising:

data processing hardware; and memory hardware in communication with the data processing hardware, the memory hardware storing instructions that when executed on the data processing hardware cause the data processing hardware to perform operations comprising:

obtaining an utterance from a user comprising a user query directed toward a digital assistant;

generating, using a language model, a first prediction string based on the utterance;

determining whether the first prediction string comprises an application programming interface (API) call to invoke a program via an API;

when the first prediction string comprises the API call to invoke the program:

calling, using the API call, the program via the API to retrieve a program result responsive to the utterance;

receiving, via the API, the program result;

updating a conversational context with the program result, the conversational context comprising the utterance; and generating, using the language model, a second prediction string based on the updated conversational context; and when the first prediction string does not comprise the API call, providing, for output from the user device, an utterance response to the utterance based on the first prediction string.

16. The system of claim 15, wherein the operations further comprise, when the first prediction string comprises the API call to invoke the program:

determining whether the second prediction string comprises the API call to invoke the program via the API; and when the second prediction string does not comprise the API call, providing, for output from the user device, a second utterance response to the user based on the second prediction string.

17. The system of claim 16, wherein the operations further comprise, after providing the second utterance response to the user:

obtaining additional utterance from the user directed toward the digital assistant;

further updating the updated conversational context with the additional utterance from the user; and generating, using the language model, a third prediction string based on the further updated conversational context.

18. The system of claim 15, wherein obtaining the utterance comprises obtaining a transcription of a verbal utterance spoken by the user and captured by the user device in streaming audio.

19. The system of claim 18, wherein obtaining the transcription comprises receiving the transcription of the verbal utterance from the digital assistant, the digital assistant generating the transcription by performing speech recognition on audio data characterizing the verbal utterance.

20. The system of claim 18, wherein obtaining the transcription comprises:

receiving audio data characterizing the verbal utterance; and performing speech recognition on the audio data characterizing the verbal utterance to generate the transcription.

21. The system of claim 15, wherein obtaining the utterance comprises receiving a textual representation of the utterance, the textual representation of the utterance input by the user via the user device.

22. The system of claim 15, wherein the utterance response comprises an audible representation including synthesized speech audibly output from the user device.

23. The system of claim 15, wherein the utterance response comprises a textual representation displayed on a graphical user interface (GUI) executing on the user device.

24. The system of claim 15, wherein the language model comprises a pre-trained language model that is fine-tuned using labeled training samples.

25. The system of claim 24, wherein the labeled training samples comprise annotated API call invocations.

26. The system of claim 15, wherein the operations further comprise, when the first prediction string comprises the API call to invoke the program via the API, determining, from the first prediction string:
   one or more parameters for the API call; and
   at least one value for each of the one or more parameters.

27. The system of claim 15, wherein the language model comprises a single end-to-end machine learning model.

28. The system of claim 15, wherein the language model comprises a text-to-text transfer transformer language model.

* * * * *